Figure 1:
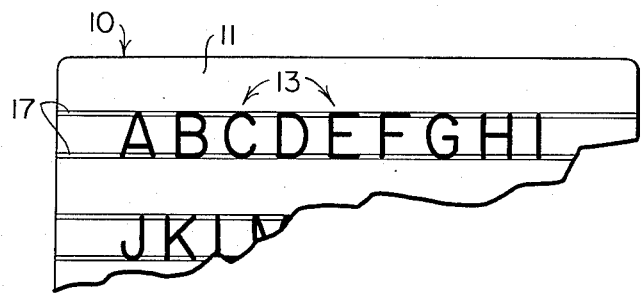

Aug. 3, 1965 R. E. HANCY 3,197,892
EDUCATIONAL DEVICE
Filed May 23, 1963 3 Sheets-Sheet 1

INVENTOR.
RAYMOND E. HANCY

Aug. 3, 1965  R. E. HANCY  3,197,892
EDUCATIONAL DEVICE

Filed May 23, 1963  3 Sheets-Sheet 2

INVENTOR.
RAYMOND E. HANCY
BY

INVENTOR.
RAYMOND E. HANCY

United States Patent Office 3,197,892
Patented Aug. 3, 1965

3,197,892
EDUCATIONAL DEVICE
Raymond E. Hancy, 360 Fairwood Circle, Berea, Ohio
Filed May 23, 1963, Ser. No. 282,676
5 Claims. (Cl. 35—37)

This invention relates to lettering and writing devices for implementing the teaching of writing skills and the learning of characters. For the beginner these are usually manuscript capitals. However, as used herein, "characters" refer to square and cursive letters of the alphabet, numbers, symbols, and other representational forms.

The invention relates to grooved devices of the type which allow the learner to "track" the characters and experience both visual and tactile presentation of the characters before being called upon to reproduce or express them. Such devices may be referred to as "tracking" devices. Particularly, the present invention relates to improvements in such tracking devices wherein the student, in the use of the device, obtains visual, aural, tactile and kinetic reinforcement, and wherein the student, in using the device, is deterred from proceeding to trace the characters incorrectly.

Most of the prior tracking devices rely solely on the grooves to guide the writing implement in tracing a particular character. Their main purpose is to act as means for motion reinforcement, very little thought being given to actually using such devices for audio and visual reinforcement. The character's shape or form before the student does not provide better visual reinforcement than printed lettering.

Moreover, in addition to the limited use as an aid in the teaching of penmanship, there are certain disadvantages in the use of the prior art tracking devices, especially when they are used to teach the very young beginner. Where there is little familiarity with the use of a writing implement, continuous, and usually individual supervision, must be given to the student to prevent disorganized and frustrating tracing of the characters. Unless there is little doubt left in the student's mind regarding the starting point of each character and the direction in which to proceed in tracing each character, the student is easily frustrated and loses confidence; and, consequently, the utility of the tracking device is lessened considerably.

There have been tracking devices which aid in guiding the writing implement by varying the depth of the groove of the juncture or crossing of the groove (see, for example, U.S. Patent No. 716,629), but in these the student is free to backtrack any part of the path he has just traced without completing the character.

The present invention overcomes the deficiencies of prior art tracking devices by including a toothed surface at the bottom of the groove defining a particular character. Comprising the toothed surface are a series of discontinuous, inclined ramps each terminating abruptly at a cliff immediately before the next ramp, so that when a pencil or stylus is moved in the groove, the point operates as a pawl and the tooth surface operates as a ratchet.

The student, in tracing a particular character, moves the point of a writing instrument along the toothed surface in the direction in which each of the ramps ascends. As each ramp is passed, the writing instrument clicks against the base of the next succeeding ramp. Thus tracking in the proper direction is encouraged by both aural and tactile reinforcement as well as by the usual motion reinforcement of prior tracking devices.

Where a character cannot be traced without backtracking certain areas, such as for example the center horizontal stroke of the letter "B," these areas are preferably provided with teeth having symmetrical approaches, thereby continuing the tactile and aural stimulus and lessening the chance that the student will reverse his direction until he has proceeded along the entire length of this portion.

Other features and advantages of the invention will become apparent from the following detailed description of the illustrative embodiments, and from the accompanying drawings.

Figure 2:
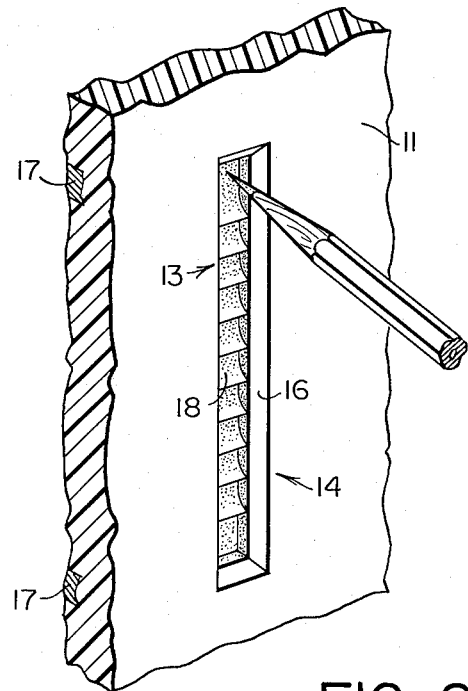
Figure 3:
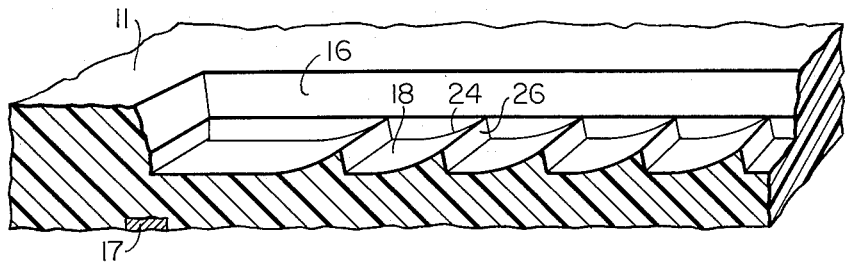
Figure 4:
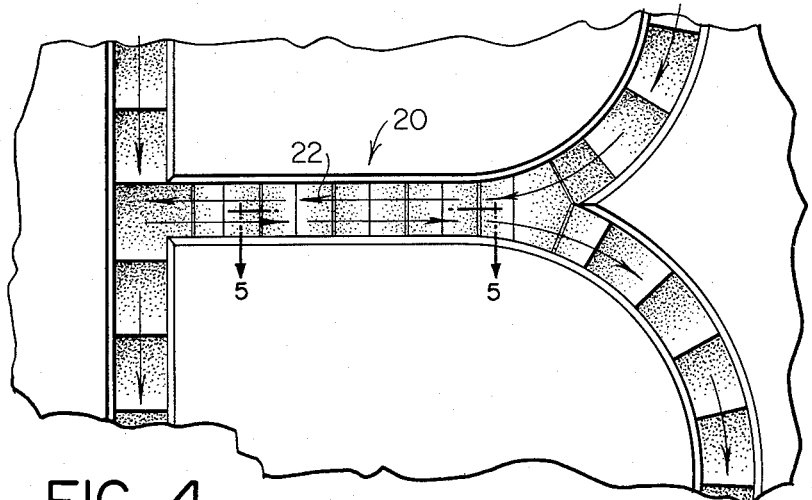
Figure 5:
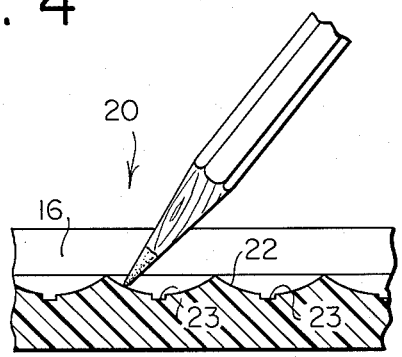
Figure 6:
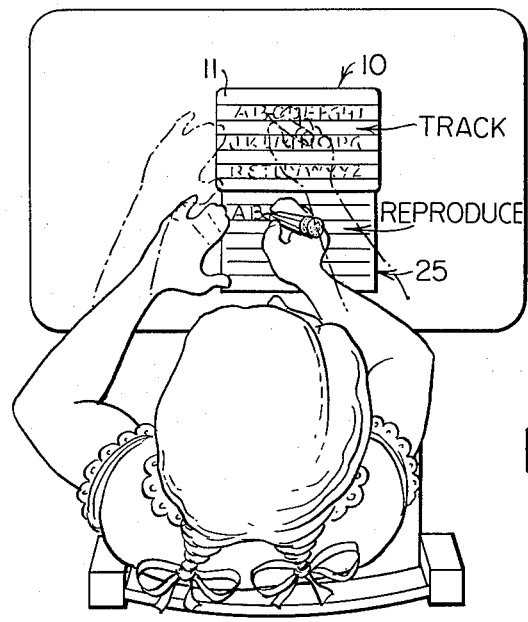
Figure 7:
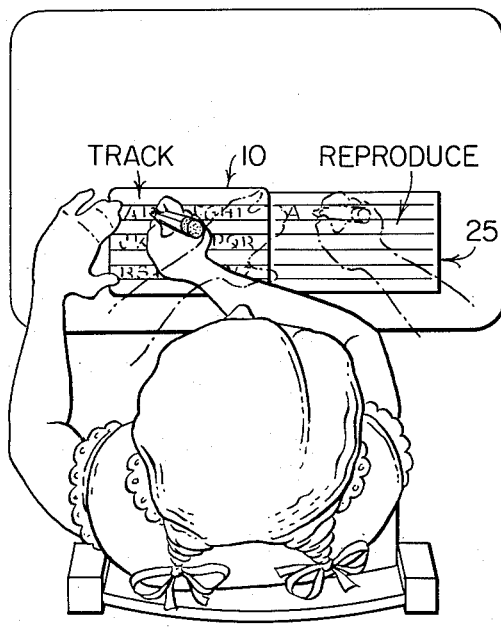

In the drawings:
FIGURE 1 is a fragmentary face-on view of a plate designed according to the present invention.
FIGURE 2 is an enlarged isometric view of the letter "I" in the plate of FIGURE 1.
FIGURE 3 is a sectional isometric view of the letter "I" shown in FIGURE 2, cut away to depict the "ratchet tooth-like" surface.
FIGURE 4 is a plan view showing part of the letter "B" in the plate of FIGURE 1, depicting the portion which must be retracked.
FIGURE 5 is a fragmentary section taken centrally of FIGURE 4, the plane of the section being indicated by the line 5—5 in FIG. 4, depicting the symmetrical teeth which are to be retracked in tracing the letter "B."
FIGURES 6 and 7 illustrate two alternative ways of using the device.

Generally illustrating a preferred form of the device 10 designed according to the present invention is a plate 11 shown in FIGURE 1. The characters 13 (manuscript letters) are defined by grooves 14 (FIGURE 2) having side walls 16 and a toothed bottom 18. If the plate is transparent, ruling lines 17 may be marked or inlaid on the underside thereof. Only cross-sections of these lines are seen in FIGURES 2 and 3.

The side walls 16 preferably are slightly beveled to accommodate the natural slanting of the writing implement employed in tracing the grooves 14.

Where the characters are of such a design that certain portions 20 must be retraced, such as for example the manuscript letter "B" (partly shown in FIGURE 4), symmetrical teeth 22 having two symmetrically inclined approaches (FIGURES 4 and 5) are used in these portions, permitting movement of the writing implement in either direction along the groove. Clicking may be augmented by transverse grooves 23 in the valleys between the symmetrical teeth.

Preferably, the corners of the device are rounded as indicated.

In the illustrated device, the characters are opacified by a dark colored or black coating (not shown) located at the bottoms of the grooves 14. The use of a back coating for the characters is optional inasmuch as the "ratchet tooth-like" surface is usually sufficiently contrasting to define the characters from the background. Additionally or alternatively, coloring means in register with the characters may be located at the back of the sheet 11 if it is transparent.

In the illustrated device, the recessed plate contains the characters of the alphabet in manuscript capitals which conform to the generally accepted standard forms for manuscript capitals used in elementary grades.

In classroom work, the device may be used as follows. The student selects paper similar in size and appearance to the recessed plate. The paper and plate are placed in either vertical or horizontal relationship as illustrated, respectively, in FIGURES 6 and 7. When used with a vertical relationship as shown in FIGURE 6, the device 10 and the practice paper 25 should be placed in a straight line parallel to the shoulders and both the device and practice paper should be slightly to the right of the body midline for right-handed students or slightly to the left of the body midline for left-handed students.

When the horizontal arrangement shown in FIGURE 7 is used, handedness becomes a factor in placement. If the learner is right handed, the practice paper is placed to the right of the plate. If the learner is left handed, the paper and plate are oppositely arranged. In either case, it is important to observe that the device and the practice paper are substantially on opposite sides of the midline of the body. The learner must cross the body midline in order to move his hands from the tracking or "experiencing" position to the writing or "expressing" position.

The device is preferably used with practice paper as described above. Pencil or pen may be used to "track" on the device 10 and to letter or reproduce other forms on the practice paper 25.

The manuscript capitals in the illustrated device may be arranged and tracked in alphabetical order from left to right. Other arrangements may be employed when indicated or preferred. For example, the letters may be arranged or introduced in the square, circular, and triangular sequence for manuscript capitals. The square letters are E, F, H, I, L, T. The circular letters are B, C, D, G, J, O, P, Q, R, S, U. The triangular letters are A, K, M, N, V, W, X, Y, Z.

In use of the device, preferably the learner is allowed a brief time to familiarize himself with the device 10 by tracking with his writing instrument. Because of the unidirectional feature of the present invention, the student is usually able to determine the proper direction and sequence in tracking each character. Thus, the chances that the student will acquire habits which will have to be changed are minimized.

A brief instruction from the teacher prescribing the tracking direction and sequence is usually all that is necessary to assure the student that he is proceeding correctly.

When teaching a class group, first tracking may be done with visual concentration on line and special relationships. The second tracking may be done with concentration on the movements required to track the character. The character is then reproduced on practice paper, preferably immediately after tracking the second time, and preferably at or near a position on the practice paper 25 corresponding to the position of the character on the device 10. The tracking on the device 10 of the particular character is then repeated as often as required to master the form.

The invention is not restricted to the slavish imitation of each and every one of the details and features described above which have been set forth merely by way of example with the intent of most fully setting forth the teaching of the invention. Obviously, devices may be provided which change, eliminate, or add certain specific details and features without departing from the invention.

What is claimed is:

1. In an educational device for teaching children penmanship, a body member having grooves with bottom and side walls forming characters therein, the grooves providing means for guiding a writing implement along a path defining said characters, the improvement wherein at least portions of the bottoms of said grooves are formed as toothed surfaces comprising a series of unidirectional ratchet teeth and wherein at least one member of said series is located on said path between any junctures and crossings that are included in the path forming a character whereby the writing implement can be tracked in the groove in only one direction.

2. The device of claim 1 wherein said toothed surfaces comprise a series of inclined ramps and cliffs.

3. The device of claim 1 wherein at least some of the grooves defining characters have bottom portions provided with bidirectional teeth.

4. The device of claim 3 in which the bidirectional teeth are symmetrical.

5. In an educational device for teaching children writing skill, a body member having writing-instrument-guiding clefts forming at least one character in the body member, the clefts providing means for guiding a writing implement along a path defining said at least one character, the improvement wherein at least part of the length of the clefts at the writing-instrument-engaging portions thereof is formed as a series of directionally biased ratchet-like segments and wherein at least one member of said series is located on said path between any junctures and crossings that are included in the path forming said character whereby the writing implement can be tracked in said at least part of the cleft length in one direction more readily than in the opposite direction.

References Cited by the Examiner
UNITED STATES PATENTS

| 716,629 | 12/02 | Dodge | 35—37 |
|---|---|---|---|
| 1,716,036 | 6/29 | Dunning | 35—37 |
| 2,277,329 | 3/42 | Kimbrough | 35—37 |

EUGENE R. CAPOZIO, *Primary Examiner.*

LAWRENCE CHARLES, JEROME SCHNALL,
*Examiners.*